United States Patent [19]

Oinoue

[11] Patent Number: 4,531,835
[45] Date of Patent: Jul. 30, 1985

[54] METHOD FOR DETECTING F-NUMBER OF LENS

[75] Inventor: Kenichi Oinoue, Tokyo, Japan

[73] Assignee: Olympus Optical Company Limited, Japan

[21] Appl. No.: 504,063

[22] Filed: Jun. 14, 1983

[30] Foreign Application Priority Data

Jun. 15, 1982 [JP] Japan ................. 57-102403

[51] Int. Cl.³ .............................. G03B 13/22
[52] U.S. Cl. ..................... 356/124; 250/201; 354/406; 354/432
[58] Field of Search ........... 356/124; 250/201 PF; 354/402, 406, 407, 430, 432

[56] References Cited

U.S. PATENT DOCUMENTS 4,373,791  2/1983  Araki ..................... 250/201 PF

Primary Examiner—R. A. Rosenberger
Assistant Examiner—Michael Vollero
Attorney, Agent, or Firm—Parkhurst & Oliff

[57] ABSTRACT

A method for detecting optically an F-number of an interchangeable imaging lens is disclosed. An image of an exit pupil of the imaging lens is projected onto an array of photoelectrically converting light receiving elements so as to measure a diameter of the image of the exit pupil of the imaging lens formed on the light receiving element array. The diameter of the exit pupil image is measured by counting the number of the light receiving elements whose photoelectrically converted outputs are larger than a predetermined threshold value and then the effective F-number of the imaging lens is detected in accordance with said counted number. Further, an image lateral shift amount detected by an image lateral shift detection system is corrected by the detected F-number and an accurate focus detection of the imaging lens can be performed.

14 Claims, 8 Drawing Figures

METHOD FOR DETECTING F-NUMBER OF LENS

BACKGROUND OF THE INVENTION

The present invention relates to a method for detecting an F-number of an imaging lens and more particularly to a method for detecting effective F-numbers of interchangeable lenses of a single-lens reflex camera.

In a usual lens system of the camera, in case of taking a picture, an amount of exposure is controlled to the best value by adjusting a diaphragm of the camera. It is well known that the effective F-number of the lens varies in accordance with the aperture of the diaphragm. Moreover, when use is made of the single-lens reflex camera which can use various interchangeable lenses, open F-numbers of respective interchangeable lenses are different from each other. In this manner, the F-number is largely varied both when the single lens is used and when the interchangeable lenses are used.

As for a focus detection of such lens systems, an image lateral shift detection method has been known. In this focus detection system, since an amount of the image lateral shift is theoretically varied in accordance with the F-number, it is necessary to detect the F-number and to correct a defocus amount of the lens system by the detected F-number each time the focus detection is performed.

FIG. 1 is a schematic view showing one embodiment of a known method for detecting the F-number of a photographing lens. In FIG. 1, a pin 2 is arranged near a lens mount of an interchangeable lens 1 such that its position denotes an open F-number of the interchangeable lens 1. After coupling the interchangeable lens 1 with a camera body 3, the position of the pin 2 in the camera body 3 is detected and the open F-number of the lens 1 is derived from the thus detected position. However, in this known F-number detection system, since mechanical parts and a space therefor are necessary, the weight of the whole camera system is increased correspondingly and various interchangeable lenses of different makers can not be used if a specification of the pin 2 and its detection device is fixedly determined.

There has been proposed another system for detecting the F-number of the lenses. In this system a switch is arranged in the camera body and every time the lens is exchanged, its F-number is manually set by the switch. However, in this case, it is very cumbersome for a user to handle the switch every time the lens is exchanged, and further, if the user forgets to set the switch corresponding to the F-number of the lens to be used, information about the F-number cannot be obtained precisely.

SUMMARY OF THE INVENTION

The present invention has for its object to eliminate the drawbacks mentioned above and to provide a method for detecting an F-number of a lens, in which an effective F-number can be detected easily and accurately without any special operations of a user.

It is another object of the invention to provide a method for detecting an F-number of a lens which can be effected by a simple optical system arranged in a camera body.

According to the invention, a method for detecting optically an F-number of an imaging optical system comprises the steps of projecting an image of an exit pupil of said imaging lens onto an array of light receiving elements by means of an exit pupil focusing lens;

detecting a magnitude of said image of exit pupil of imaging lens formed on the light receiving element array; and detecting an effective F-number of said imaging lens in accordance with the detected magnitude of the image of exit pupil of the imaging lens.

The present invention also relates to a method for detecting a focal condition of an imaging optical system and has for its object to provide a focus detection method in which a focus condition of an imaging optical system can be detected very accurately by correcting a defocus amount detected by an image lateral shift in accordance with a detected F-number.

According to the invention, a method for detecting a focus condition of an imaging lens comprises the steps of projecting two images on a first light receiving element array by means of an auxiliary optical system, said two images being formed by light fluxes transmitted through different areas of the imaging lens;

detecting a defocus amount of the imaging lens by detecting a lateral shift of said two images;

projecting an image of an exit pupil of the imaging lens on a second light receiving element array by means of an exit pupil focusing lens;

detecting a magnitude of said image of the exit pupil of the imaging lens formed on the second light receiving element array;

deriving an effective F-number of said imaging lens in accordance with the detected magnitude of the image of the exit pupil of the imaging lens; and correcting said defocus amount of the imaging lens in accordance with the effective F-number of the imaging lens to derive a corrected defocus amount.

DESCRIPTION OF THE PREFERRED EMBODIMENTS

Figure 1:
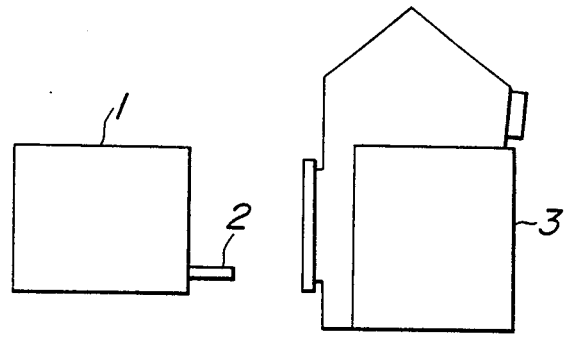
FIG. 1 is a schematic view showing a known F-number detecting method.
Figure 2A:
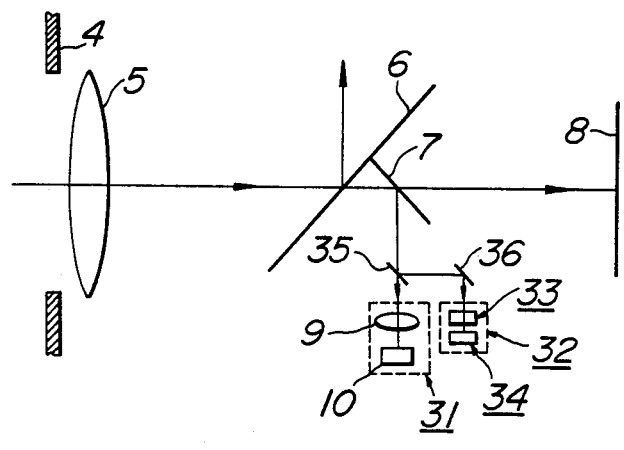
FIG. 2A is a schematic view illustrating a single-lens reflex camera to which one embodiment of the F-number detection method and focus condition detecting method according to the invention are applied.
Figure 2B:
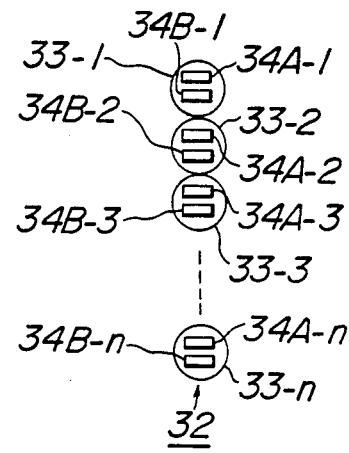
FIG. 2B is a plan view depicting one embodiment of an optical system for detecting an image lateral shift.

FIGS. 2A and 2B are schematic and plan views, respectively, showing one embodiment of a reflex camera to which an F-number detection system 31 and an image lateral shift detection system 32 according to the invention are applied. As shown in FIGS. 2A and 2B, a light flux passing through a diaphragm 4 and an imaging lens 5 is divided into two light fluxes by a quick return mirror 6 made of a half mirror, and one light flux reflected by the quick return mirror 6 is introduced into a finder optical system through a pentagonal prism not shown and the other light flux transmitted through the quick return mirror 6 is reflected by a mirror 7. The thus reflected light flux is further divided into two light fluxes by a half mirror 35, and one light flux transmitted through the half mirror 35 is introduced into the F-number detection system 31 and the other light flux reflected by the half mirror 35 is further reflected by a mirror 36 and is introduced into the image lateral shift detection system 32.

In the F-number detection system 31, the image of the exit pupil of the imaging lens is formed on an array of light receiving elements 10 by means of a pupil focusing lens 9. Moreover, a film surface 8 is arranged in such a manner that when the quick-return mirror 6 is removed from an optical axis the image is focused on the film surface 8.

In the image lateral shift detection system 32, a light receiving element array 34 is constituted of plural pairs of light receiving elements 34A-1, 34B-1; 34A-2, 34B-2; . . . 34A-n, 34B-n, and each pair of light receiving elements 34A-i, 34B-i receives the light flux through an auxiliary optical system 33-i such as lenticular lenses, micro prisms, stripe filters and micro lenses, as shown in FIG. 2B. The auxiliary optical system serves to divide an image of the exit pupil of the lens 5. As for the focus detection, use may be made of various known evaluation methods in which the focus condition is detected by measuring an amount of a lateral shift of two divided exit pupil images formed on the array 34.

According to the invention, by taking into account the fact that a diameter of the exit pupil image formed on the light receiving element array 10 is largely varied depending upon the effective F-number of the lens 5, the F-number is detected by measuring the dimension of the pupil image. In the embodiment shown in FIG. 2A, the F-number detection system 31 and the image lateral shift detection system 32 can be arranged at any portion in the camera body, but it is preferable to arrange these systems near the optical axis of the imaging lens 5 because no eclipse occurs near the optical axis. It should be noted that the F-number detection system 31 and lateral shift detection system 32, particularly their light receiving element arrays 10 and 34 may be formed integrally.

Figure 3:
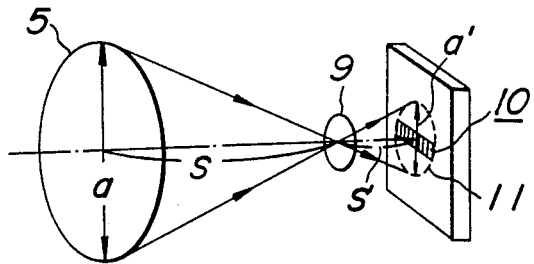
FIG. 3 is a schematic perspective view showing a positional relation of an imaging lens and an array of light receiving elements in an F-number detection system.

FIG. 3 is a schematic view showing the positional relation of the imaging lens 5 and the light receiving element array 10. Hereinafter, the F-number detection method will be explained in detail with reference to FIG. 3. As shown in FIG. 3, if it is assumed that the diameter of the exit pupil of the imaging lens 5 is a, a distance between the imaging lens 5 and the pupil focusing lens 9 is S, a distance between the pupil focusing lens 9 and the light receiving element array 10 is S', and a focal distance of the pupil focusing lens 9 is f, a relation $f \approx S'$ is obtained since usually $S >> f$. Assuming a diameter of the exit pupil image formed on the array 10 to be a', a relation $S/a = S'/a' \approx f/a'$ is derived since $a'/a = S'/S$. Moreover, since the pupil focusing lens 9 is positioned at the focal position of the imaging lens 5, the F-number of the imaging lens 5 is $F = S/a$ and thus a constant value. Therefore, an equation $F = f/a'$ is derived from the above relations, and thus it is possible to detect the F-number by measuring the diameter a' of the exit pupil image.

Figure 4:
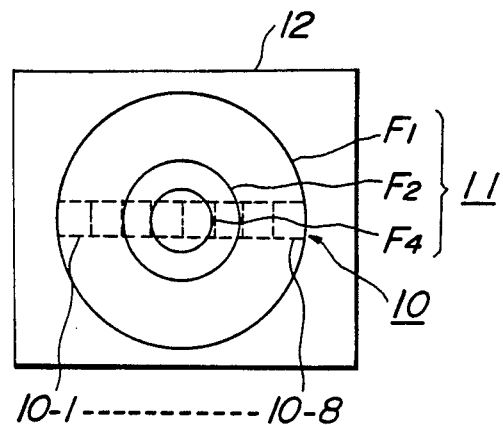
FIG. 4 is a schematic view illustrating a magnitude of an image of an exit pupil formed on the array of light receiving elements according to the invention.

FIG. 4 is a schematic view showing one embodiment of the image of the exit pupil formed on the light receiving array 10. In this embodiment, the light receiving array 10 is constituted of eight light receiving elements 10-1 to 10-8 arranged on a substrate 12 and is arranged symmetrically with respect to a center of the exit pupil image 11. The diameter of the pupil image 11 is varied in accordance with the F-number of the imaging lens 5 as shown in FIG. 4. In this case, in order to eliminate undesired light, a light shielding plate may be arranged around the pupil focusing lens 9.

Figure 5:
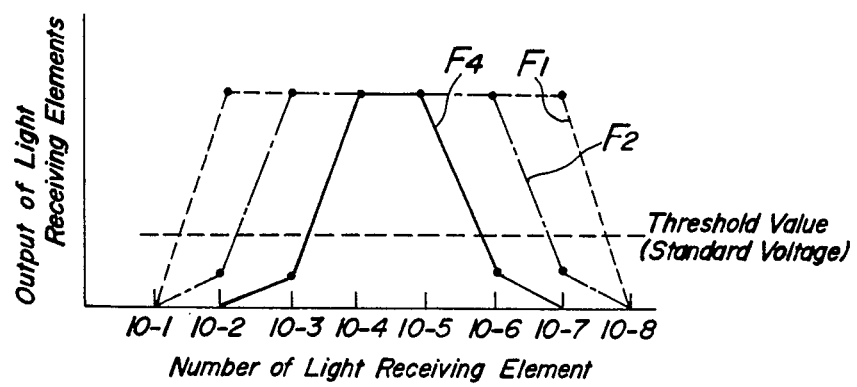
FIG. 5 is a graph depicting a distribution of photoelectrically converted outputs of respective light receiving elements shown in FIG. 4.

FIG. 5 is a graph showing a distribution of photoelectrically converted outputs of respective light receiving elements illustrated in FIG. 4. As shown in FIG. 5, the number of the light receiving elements whose outputs are larger than a predetermined threshold value (standard voltage) is varied corresponding to the F-number of the imaging lens. In this embodiment, in case that F-number is F1, F2 and F4, the number of the elements whose outputs are larger than the threshold value is six, four and two, respectively. Therefore, when a suitable relation between the F-number and the diameter of the pupil image has previously been determined, the F-number of the imaging lens can be detected by counting the number of the light receiving elements whose outputs are larger than the threshold value.

Figure 6:
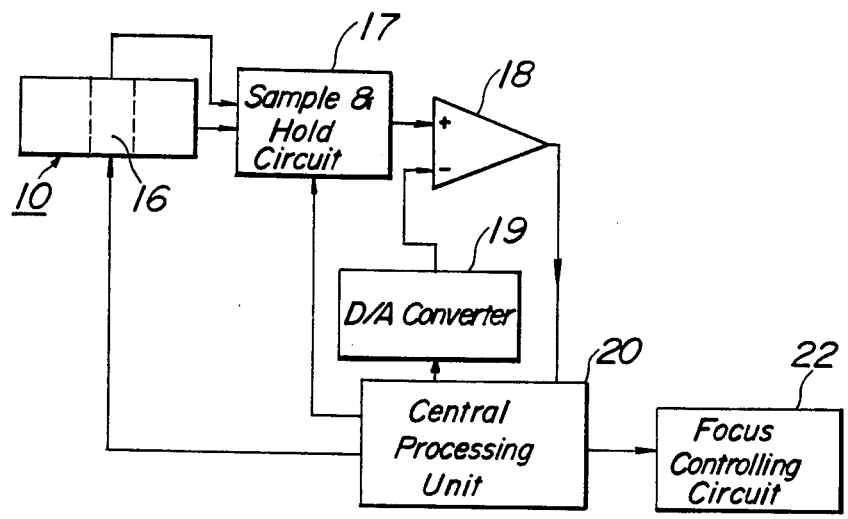
FIG. 6 is a block diagram showing one embodiment of the F-number detection system according to the invention.

FIG. 6 is a block diagram showing one embodiment of the detection system according to the invention. At first, a start signal is supplied to the light receiving element array 10 consisting of integrating-type light receiving elements such as MOS photodiodes from a central processing unit (CPU) 20 to start the photo current integrating operation. In the course of this operation, the output from a center element 16 of the light receiving element array 10 is monitored. To this end, the output thereof is supplied to one input terminal of a comparator 18 through a sample and hold circuit 17. To the other input terminal of the comparator 18 is applied a reference voltage which is slightly larger than the threshold value shown in FIG. 5 from the CPU 20 through a D/A converter 19.

When the output of the center element 16 becomes larger than the reference voltage, an output of the comparator 18 is inverted to indicate the end of the photo current integrating operation. The thus inverted output is supplied to the CPU 20 so as to stop the light receiving operation of the light receiving element array 10, and then an integrated output voltage of respective light receiving elements is read out one by one. The thus read out output voltages are successively applied to the comparator 18 through the sample and hold circuit 17 and are compared with a standard voltage corresponding to the threshold value shown in FIG. 5 which is generated from the CPU 20 through the D/A converter 19. When the output is larger than the standard voltage, a counter arranged in the CPU 20 is counted up. Therefore, when all the outputs of the light receiving elements are read out, the number of the light receiving elements whose outputs are larger than the standard voltage is summed up in the counter. Then, the counted number is stored in a memory arranged in the CPU 20 and is compared with the values previously determined corresponding to the F-numbers so as to detect the effective F-number of the imaging lens. In the embodiment mentioned above, the threshold value is fixed but it is possible to set a variable threshold value which may be high or low depending on a long or short integration time, respectively. In this manner, the detected F-number of the imaging lens is supplied to a focus controlling circuit 22 so as to correct the defocusing amount in accordance with the detected F-numbers.

Figure 7:
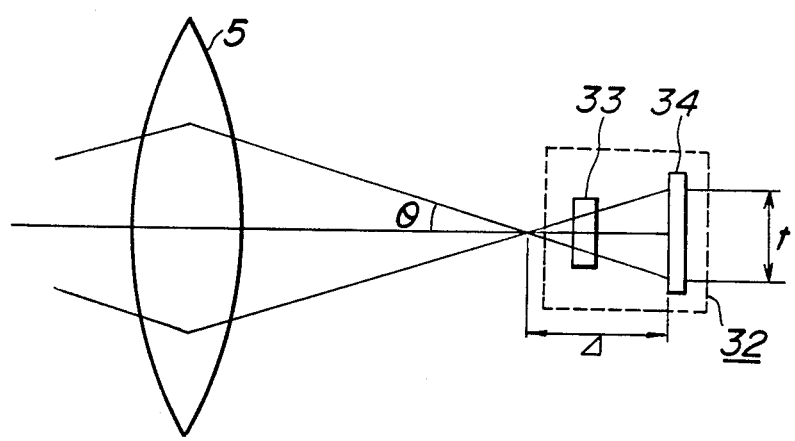
FIG. 7 is a schematic view explaining the method for detecting a defocus amount by taking into account a detected F-number.

FIG. 7 is a schematic view explaining a method for correcting a defocus amount in accordance with the F-number. In FIG. 7, the image lateral shift detection system 32 comprising the auxiliary optical system 33 and the light receiving element array 34 is arranged near the focal plane. It is assumed that an angle between the optical axis and a principal light transmitted through right half or left half of the imaging lens is $\theta$, the defocusing amount is $\Delta$ and the lateral shift amount on the light receiving element array 34 is t. Then the following relation is obtained;

$$t = 2\Delta \tan \theta$$

therefore $$\Delta = t/2 \tan \theta.$$

Now, further assuming that the light emanating from the half position of the imaging lens 5 is the principal light as shown in FIG. 7 and the effective F-number is F, the following equation is derived:

$$\tan \theta = 1/4F.$$

From the equations mentioned above is derived the following equation, $\Delta = 2F \cdot t$. Therefore, the correct defocus amount $\Delta$ can be obtained from the effective F-number and the lateral shift amount t, and thus it is possible to effect a precise focus controlled by utilizing the thus obtained defocus amount.

In the embodiment mentioned above, all the calculations including the lateral shift calculation may be effected in the processing circuit arranged in the CPU or may be performed by using a look-up table previously stored in the memory representing the relation between the value of $\tan \theta$ and the F-number. In the same manner, it is possible to derive the corrected defocus amount $\Delta$ from a look-up table representing the relation between the F-number F and the lateral shift amount t. In these cases, if use is made of the precise look-up table, it is possible to effect the focus controlling correctly, but if not, the focus controlling is effected as so-called zone focus detection.

As mentioned above, according to the invention, the following effects are obtained:

(1) Since it is not necessary to use the special mechanical parts such as the pin and its position detecting mechanism, the interchangeability of the lens is increased.

(2) Since the F-number detection system according to the invention is light and small, it is effective to apply this system to a small size optical apparatus such as the single-lens reflex camera.

(3) According to the invention, it is possible to measure the F-number automatically.

(4) If this system is used in a special condition largely apart from the normal F-number of the lens, i.e. in case of close-up photography, it is still possible to measure the effective F-number.

(5) As compared with the case of inputting the F-number by a switch, the operation is simple and the reliability is improved.

What is claimed is:

1. A method for detecting optically an F-number of an imaging optical system comprising the steps of
   projecting an image of an exit pupil of an imaging lens onto an array of light receiving elements by means of an exit pupil focusing lens;
   detecting a magnitude of said image of said exit pupil of said imaging lens formed on the light receiving element array; and
   detecting an effective F-number of said imaging lens in accordance with the detected magnitude of the image of the exit pupil of the imaging lens.

2. A method according to claim 1, wherein said step of detecting the magnitude of the image of the exit pupil comprises a step of counting the number of said light receiving elements whose photoelectrically converted outputs are larger than a predetermined standard threshold value, and wherein said effective F-number is detected in accordance with the counted number.

3. A method according to claim 2, wherein said photoelectrically converted outputs are generated from integrating-type light receiving elements.

4. A method according to claim 3, wherein an output of a center element of said light receiving array is monitored and a light receiving operation of all the light receiving elements is ended when the output of the center element becomes larger than a reference threshold value which is slightly larger than said standard threshold value.

5. A method according to claim 4, wherein said standard threshold value is varied in accordance with a time during which the light receiving operation has been effected.

6. A method according to claim 1, wherein the effective F-number is derived by dividing a focal length f of the exit pupil focusing lens by the magnitude a' of the image of the exit pupil of the imaging lens formed on the light receiving element array.

7. A method for detecting a focus condition of an imaging lens comprising the steps of
   projecting two images on a first light receiving element array by means of an auxiliary optical system, said two images being formed by light fluxes transmitted through different areas of the imaging lens;
   detecting a defocus amount of the imaging lens by detecting a lateral shift of said two images;
   projecting an image of an exit pupil of the imaging lens on a second light receiving element array by means of an exit pupil focusing lens;
   detecting a magnitude of said image of the exit pupil of the imaging lens formed on the second light receiving element array;
   deriving an effective F-number of said imaging lens in accordance with the detected magnitude of the image of the exit pupil of the imaging lens; and
   correcting said defocus amount of the imaging lens in accordance with the effective F-number of the imaging lens to derive a corrected defocus amount.

8. A method according to claim 7, wherein said step of correcting the defocusing amount is performed in accordance with an equation of $\Delta = 2F \cdot t$, where $\Delta$ is the corrected defocus amount of the imaging optical system, F is the effective F-number of the imaging optical system and t is the lateral shift of the two images formed on the first light receiving element array.

9. A method according to claim 8, wherein said calculation in accordance with the equation $\Delta = F \cdot t$ is performed by using a look-up table representing a relation between the effective F-number F and lateral shift t.

10. A method according to claim 7, wherein said step of detecting the magnitude of the image of the exit pupil comprises a step of counting the number of said light receiving elements whose photoelectrically converted outputs are larger than a predetermined standard threshold value, and wherein said effective F-number is detected in accordance with the counted number.

11. A method according to claim 10, wherein said photoelectrically converted outputs are generated from integrating-type light receiving elements.

12. A method according to claim 11, wherein an output of a center element of said light receiving array is monitored and a light receiving operation of all the light receiving elements is ended when the output of the center element becomes larger than a reference threshold value which is slightly larger than said standard threshold value.

13. A method according to claim 12, wherein said standard threshold value is varied in accordance with a time during which the light receiving operation has been effected.

14. A method according to claim 7, wherein the effective F-number is derived by dividing a focal length f of the exit pupil focusing lens by the magnitude a' of the image of the exit pupil of the imaging lens formed on the light receiving element array.

* * * * *